United States Patent
Kerr et al.

(10) Patent No.: US 10,909,584 B2
(45) Date of Patent: Feb. 2, 2021

(54) CONTENT RELEVANCE WEIGHTING SYSTEM

(71) Applicant: NEXRF, CORP., Reno, NV (US)

(72) Inventors: Michael A. Kerr, Reno, NV (US); David Stewart, Stateline, NV (US)

(73) Assignee: NEXRF CORP., Reno, NV (US)

( * ) Notice: Subject to any disclaimer, the term of this patent is extended or adjusted under 35 U.S.C. 154(b) by 0 days.

(21) Appl. No.: 15/183,048

(22) Filed: Jun. 15, 2016

(65) Prior Publication Data
US 2017/0076338 A1    Mar. 16, 2017

Related U.S. Application Data

(63) Continuation-in-part of application No. 13/252,159, filed on Oct. 3, 2011, now Pat. No. 9,396,487, and a
(Continued)

(51) Int. Cl.
    *G06Q 30/00*     (2012.01)
    *G06Q 30/02*     (2012.01)
    (Continued)

(52) U.S. Cl.
    CPC ....... *G06Q 30/0282* (2013.01); *G06F 16/334* (2019.01); *G06F 16/3326* (2019.01);
    (Continued)

(58) Field of Classification Search
    None
    See application file for complete search history.

(56) References Cited

U.S. PATENT DOCUMENTS

| | | | |
|---|---|---|---|
| 6,640,218 B1 | 10/2003 | Golding et al. | |
| 7,830,250 B2 * | 11/2010 | Huseth | G01S 11/06 340/500 |

(Continued)

FOREIGN PATENT DOCUMENTS

| | | | | |
|---|---|---|---|---|
| WO | WO-2004021733 A1 * | 3/2004 | | G01S 5/0226 |
| WO | WO-2004038938 A1 * | 5/2004 | | H04B 1/7156 |
| WO | WO-2004054137 A1 * | 6/2004 | | H04W 4/029 |

OTHER PUBLICATIONS

• Willis et al. A Passive RFID Information Grid for Location and Proximity Sensing for the Blind User. (Dec. 25, 2004). Retrieved online Jun. 5, 2020. http://citeseerx.ist.psu.edu/viewdoc/download?doi=10.1.1.95.1180&rep=rep1&type=pdf (Year: 2004).*
(Continued)

*Primary Examiner* — James A Reagan
(74) *Attorney, Agent, or Firm* — Kerr IP Group, LLC

(57) ABSTRACT

A system for adjusting a relevance weight value for a content item is described. The system comprises a content delivery module configured to deliver a plurality of content items to a device via a network. The content items are displayed on the device. A content storage module is configured to store a relevance weight value and a location in association with each content item. A location detection module is configured to determine a location of the wireless device. A user provides a feedback input for a content item. The relevance weight value associated with the location and the content item is adjusted according to the feedback input provided.

18 Claims, 12 Drawing Sheets

Related U.S. Application Data continuation-in-part of application No. 13/218,256, filed on Aug. 25, 2011, now Pat. No. 10,430,492, application No. 15/183,048, which is a continuation-in-part of application No. 13/153,214, filed on Jun. 3, 2011, now Pat. No. 9,507,494, application No. 15/183,048, which is a continuation-in-part of application No. 13/153,238, filed on Jun. 3, 2011, now Pat. No. 9,408,032, application No. 15/183,048, which is a continuation-in-part of application No. 13/153,248, filed on Jun. 3, 2011, now Pat. No. 9,615,347, application No. 15/183,048, which is a continuation-in-part of application No. 13/251,745, filed on Oct. 3, 2011, now Pat. No. 9,406,079.

(60) Provisional application No. 61/482,834, filed on May 5, 2011, provisional application No. 61/472,054, filed on Apr. 5, 2011, provisional application No. 61/376,936, filed on Aug. 25, 2010, provisional application No. 61/351,770, filed on Jun. 4, 2010, provisional application No. 61/352,242, filed on Jun. 7, 2010, provisional application No. 61/351,677, filed on Jun. 4, 2010, provisional application No. 61/427,753, filed on Dec. 28, 2010, provisional application No. 61/427,755, filed on Dec. 28, 2010, provisional application No. 61/454,664, filed on Mar. 21, 2011.

(51) Int. Cl.
*G06F 16/33* (2019.01)
*G06F 16/332* (2019.01)
*G06F 16/9537* (2019.01)
*G06F 16/9535* (2019.01)
*H04B 17/318* (2015.01)
*H04W 4/021* (2018.01)

(52) U.S. Cl.
CPC ...... *G06F 16/9535* (2019.01); *G06F 16/9537* (2019.01); *G06Q 30/0254* (2013.01); *H04B 17/318* (2015.01); *H04W 4/021* (2013.01)

(56) References Cited

U.S. PATENT DOCUMENTS

| | | |
|---|---|---|
| 8,738,024 B1 | 5/2014 | Kerr et al. |
| 8,942,995 B1* | 1/2015 | Kerr ..................... H04W 4/021 463/25 |
| 2002/0198775 A1 | 12/2002 | Ryan |
| 2004/0023721 A1* | 2/2004 | Giobbi ................ G07F 17/3248 463/39 |
| 2005/0085257 A1 | 4/2005 | Laird et al. |
| 2005/0136949 A1 | 6/2005 | Barnes |
| 2005/0261063 A1 | 11/2005 | Boyd et al. |
| 2006/0181411 A1* | 8/2006 | Fast ..................... G01S 5/0018 340/539.13 |
| 2006/0194633 A1* | 8/2006 | Paulsen .............. G06Q 30/0209 463/43 |
| 2006/0287810 A1* | 12/2006 | Sadri ..................... G01C 21/20 701/438 |
| 2007/0060306 A1 | 3/2007 | Amaitis et al. |
| 2008/0076572 A1 | 3/2008 | Nguyen et al. |
| 2008/0113785 A1 | 5/2008 | Alderucci et al. |
| 2008/0153515 A1 | 6/2008 | Mock et al. |
| 2008/0207296 A1 | 8/2008 | Lutnick et al. |
| 2009/0197684 A1 | 8/2009 | Arezina et al. |
| 2010/0048242 A1 | 2/2010 | Rhoads et al. |
| 2011/0078167 A1 | 3/2011 | Sundaresan et al. |

OTHER PUBLICATIONS

• Zafari et al. A Survey of Indoor Localization Systems and Technologies. (Aug. 15, 2001). Retrieved online Jun. 5, 2020. https://spiral.imperial.ac.uk/bitstream/10044/1/69224/2/Indoor%20Localization%20Survey-2019-03.pdf (Year: 2001).*

• Anand et al. Brands as Beacons: A New Source of Loyalty to Multiproduct Firms. (May 15, 2004). Retrieved online Jun. 5, 2020. https://www.hbs.edu/faculty/Publication%20Files/BrandsasBeacons_f209692f-ae53-4813-9150-c8b4d0a3991c.pdf (Year: 2004).*

* cited by examiner

| User_Profile ||
|---|---|
| User_ID | 12345678 | ~302
| Display_Name | Joe | ~304
| Gender | Male | ~306
| Zip_Code | 89521 | ~308
| Age | 35 | ~310

| Attribute_Group | |
|---|---|
| Attribute_ID | 11111111 |
| Attribute_Category | Sport |
| Attribute Value | Skiing |

| User_Attribute_Group | |
|---|---|
| User_ID | 12345678 |
| Attribute_ID | 11111111 |

| Group_Content_Rating | |
|---|---|
| Content_ID | 00000001 |
| Attribute_ID | 11111111 |
| Relevance_Weight | 105 |

| Location_Content_Rating | |
|---|---|
| Content_ID | 00000001 |
| Location_ID | 22222222 |
| Relevance_ Weight | 95 |

| Content_Rating_Time ||
|---|---|
| Content_ID | 00000001 |
| Time | 2011-03-28 11:01 |
| Relevance_ Weight | 95 |

CONTENT RELEVANCE WEIGHTING SYSTEM

CROSS-REFERENCE

This patent application is a continuation-in-part of patent application Ser. No. 13/252,159 (now U.S. Pat. No. 9,396,487) entitled SYSTEM AND METHOD FOR WEIGHTING CONTENT ITEMS filed on Oct. 3, 2011 that claims the benefit of provisional patent application 61/482,834 entitled CONTENT RELEVANCE WEIGHTING SYSTEM filed on May 5, 2011, provisional patent application 61/427,753 entitled INTERACTIVE DISPLAY SYSTEM filed on Dec. 28, 2010, provisional patent application 61/427,755 entitled INTERACTIVE DISPLAY SYSTEM filed on Dec. 28, 2010, provisional patent application 61/454,664 entitled USER INTERFACE FOR GEOFENCE-ASSOCIATED CONTENT filed on Mar. 21, 2011, provisional patent application 61/472,054 entitled CONTENT RELEVANCE WEIGHTING SYSTEM filed on Apr. 5, 2011;

this patent application is a continuation-in-part of patent application Ser. No. 13/251,745 (now U.S. Pat. No. 9,406,079) entitled CONTENT RELEVANCE WEIGHTING SYSTEM filed on Oct. 3, 2011 that claims the benefit of provisional patent application 61/482,834 entitled CONTENT RELEVANCE WEIGHTING SYSTEM filed on May 5, 2011, provisional patent application 61/427,753 entitled INTERACTIVE DISPLAY SYSTEM filed on Dec. 28, 2010, provisional patent application 61/454,664 entitled USER INTERFACE FOR GEOFENCE-ASSOCIATED CONTENT filed on Mar. 21, 2011, and provisional patent application 61/472,054 entitled CONTENT RELEVANCE WEIGHTING SYSTEM filed on Apr. 5, 2011;

this patent application is a continuation-in-part of patent application Ser. No. 13/218,256 (now U.S. Pat. No. 10,430,492) entitled SYSTEM AND METHOD FOR HANDSET POSITIONING WITH DYNAMICALLY UPDATED WI-FI FINGERPRINTING filed on Aug. 25, 2011 that claims the benefit of provisional patent application 61/376,936 filed on Aug. 25, 2010, provisional patent application 61/351,770 filed on Jun. 4, 2010, and provisional patent application 61/352,242 filed on Jun. 7, 2010;

this patent application is a continuation-in-part of patent application Ser. No. 13/153,214 (U.S. Pat. No. 9,507,494) entitled MERCHANT CONTROLLED PLATFORM SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,238 (U.S. Pat. No. 9,408,032) entitled MERCHANT CONTROL PLATFORM SYSTEM AND METHOD WITH LOCATION-BASED CONTENT DELIVERY filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010;

this patent application is a continuation-in-part of patent application Ser. No. 13/153,248 (U.S. Pat. No. 9,615,347) entitled LOCATION POSITIONING ENGINE SYSTEM AND METHOD filed on Jun. 3, 2011 that claims the benefit of provisional patent application 61/351,677 filed on Jun. 4, 2010, provisional patent application 61/351,770 filed on Jun. 4, 2010, and provisional patent application 61/352,242 filed on Jun. 7, 2010; and the above patent applications hereby incorporated by reference in this patent application.

FIELD

The present invention relates to a system and method for delivering relevant content to a wireless handset. More particularly, the present invention relates to a system and method for adjusting a relevance weight value for a content item based on the location of a user reacting to the content.

BACKGROUND

Services that provide ranked lists of results are well known, for example, in the areas of internet search and advertising. Such services may gauge user response to the provided content to improve the relevance of ranked results provided to the users of the service. Passive user responses, such as selection of content, manipulation of content, or time spent viewing particular content are monitored and the relevance weighting applied to the content is adjusted accordingly. Active user feedback, such as a rating provided by the user for a particular content item, is also used to impact relevance weighting for content.

User profile information such as user interest, user location, etc. has been used in existing content delivery systems to impact the relevance weighting of content. However, existing systems lack means for adjusting relevance weighting of content for a group of users having a shared profile attribute based on both active and passive user responses to received content.

Moreover, there remains a need for a content delivery system that ranks content based on the location of the user accessing the content.

SUMMARY

A system for adjusting a relevance weight value for a content item is described. The system comprises a network. The system further comprises a content storage module communicatively coupled to the network. The content storage module is configured to store a plurality of content items. The content storage module is further configured to store an initial relevance weight value and a location in association with each content item. The system also comprises a content delivery module communicatively coupled to the network. The content delivery module is configured to deliver a plurality of content items to a wireless device via the network. The system further comprises a location detection module communicatively coupled to the network. The location detection module is configured to determine a location of the wireless device. The wireless device comprises a display to show the content items and a user interface to receive feedback input associated with a content item. The user interface comprises a positive review input corresponding to a positive feedback input and a negative review input corresponding to a negative feedback input. A relevance weight adjustment module is communicatively connected to the network. The relevance weight module is configured to perform one of a subtraction operation or an addition operation. The subtraction operation comprises subtracting a first point value from the relevance weight value associated with the location and the content item when the negative review input is selected. The addition operation comprises adding a first point value to the relevance weight value associated with the location and the content item when the positive review input is selected.

In another embodiment, a system for adjusting a relevance weight value for a content item comprises a means for displaying content items.

A method for adjusting a relevance value for a content item is also described. The method comprises storing a plurality of content items with a content storage module communicatively coupled to a network. The method further comprises storing an initial relevance weight value and a location in association with each content item. A plurality of content items are delivered to a wireless device via the network. A location detection module determines the location of the wireless device. A plurality of content items are displayed on the wireless device. A feedback input is received with a user interface of the wireless device. The user interface comprises a positive review input corresponding to a positive feedback input for a content item and a negative review input corresponding to a negative feedback input for a content item. When the negative review input is selected, a first point value is subtracted from the relevance weight value associated with the location and the content item. When the positive review input is selected, a first point value is added to the relevance weight value associated with a location and a content item.

FIGURES

The present invention will be more fully understood by reference to the following drawings which are for illustrative, not limiting, purposes.

FIG. 3 shows an illustrative database table entry for a user profile.

FIG. 4 shows an illustrative database table entry for associating a user identification with an attribute group.

FIG. 5 shows an illustrative database table entry for associating a user identification with an attribute group.

FIG. 6 shows an illustrative database table entry for associating a content item with an attribute group.

FIG. 7 shows an illustrative database table entry for associating a content item with a location identifier.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A relevance weighting system for content is described. Content items are accessible to a plurality of users having user profiles. The content items are delivered via a network to a computing device, such as a wireless handset or other wireless device. The user of the wireless handset may actively provide feedback for a content item. Based on the feedback received, a relevance weight value associated with the content item is adjusted. One or more passive measures of user response to the content item may also be used to adjust the relevance weight value associated with the content item.

According to one embodiment, a relevance weight value is associated with a location and with a content item, for example, in a database table. When positive feedback is received, a predetermined point value is added to the relevance weight value associated with the content item and the location. Similarly, if negative feedback is received, a predetermined point value is subtracted from the content item relevance weight value associated with the content item and the location.

The location may be a location of the wireless handset. In one embodiment, the location is determined based on signals received by the wireless handset, such as Wi-Fi signals. In another embodiment the location of the wireless handset is determined using Global Positioning System (GPS) data. The location may alternatively be determined based on information provided by the user of the wireless handset via a user interface or through a user profile.

In an alternative embodiment, if a content item is delivered more than a predetermined number of times without being selected, a predetermined point value is subtracted from a relevance weight value associated with the content item.

In another embodiment, if a content item is selected, a predetermined point value is added to a relevance weight value associated with the content item.

It will be recognized that the relevance weight value may be adjusted according to a combination of the embodiments described above. In each of the described embodiments, the relevance weight value may be adjusted for the association between a content item and a location. Alternatively, the relevance weight value may be adjusted for each instance of a content item (e.g., for each location with which the content item is associated).

Figure 1:
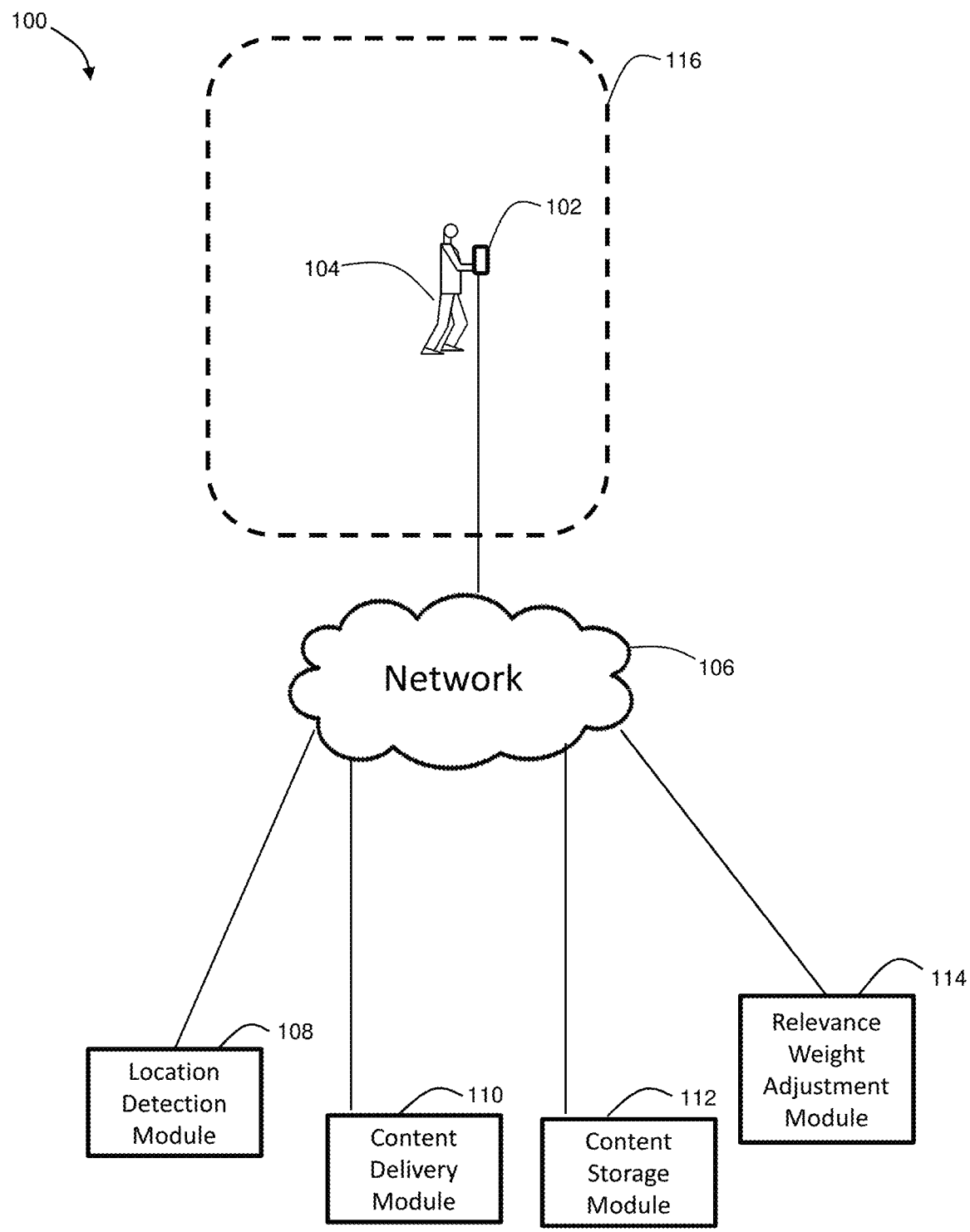
FIG. 1 shows a system diagram of an illustrative content item relevance weighting system.

Referring to FIG. 1, a system diagram of an illustrative content item relevance weighting system is shown. Wireless handset 102 is operated by user 104. The wireless handset may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system.

Location detection module 108 is communicatively coupled to network 106. The location detection module is configured to determine the location of wireless handset 102 based on information transmitted from the wireless handset to the location detection module via the network. In some embodiments, the location detection module is configured to determine whether wireless handset 102 is located within a geofence, such as geofence 116. A geofence is a virtual geographic boundary line delineating a geographic area. The area within the geofence may be referred to as a content bubble.

Content delivery module 110 transmits content items to wireless handset 102 via network 106. In some embodiments, content items are delivered to the wireless handset periodically. In other embodiments, the content items may be delivered when an event occurs, such as a wireless handset 102 entering a geofence 116.

Content storage module 112 stores a plurality of content items. For example, the content storage module may comprise a plurality of tables in a database. The database is typically stored in memory on a server.

Relevance weight adjustment module 114 adjusts a relevance weight value associated with a content item. For example, the relevance weight adjustment module may add to or subtract from a relevance weight value stored in a database table in association with a content item. In some embodiments, the database table stores an association between a content item, a location, and a relevance weight value.

Location detection module 108, content delivery module 110, content storage module 112 and relevance weight adjustment module 114 each run on a processor, for example, a processor of a server. In some embodiments, modules 108-114 run on a single processor. In other embodiments, one or more of the modules may run on separate processors.

The wireless handset transmits information using wireless communication including, by way of example and not of limitation, CDMA, WCDMA, GSM or UMTS or any other wireless communication system such as wireless local area network (WLAN), Wi-Fi or WiMAX. Network 106 may be a local area network ("LAN"), wide area network ("WAN"), or any other network to facilitate communication among computers and wireless communication devices.

Figure 2:
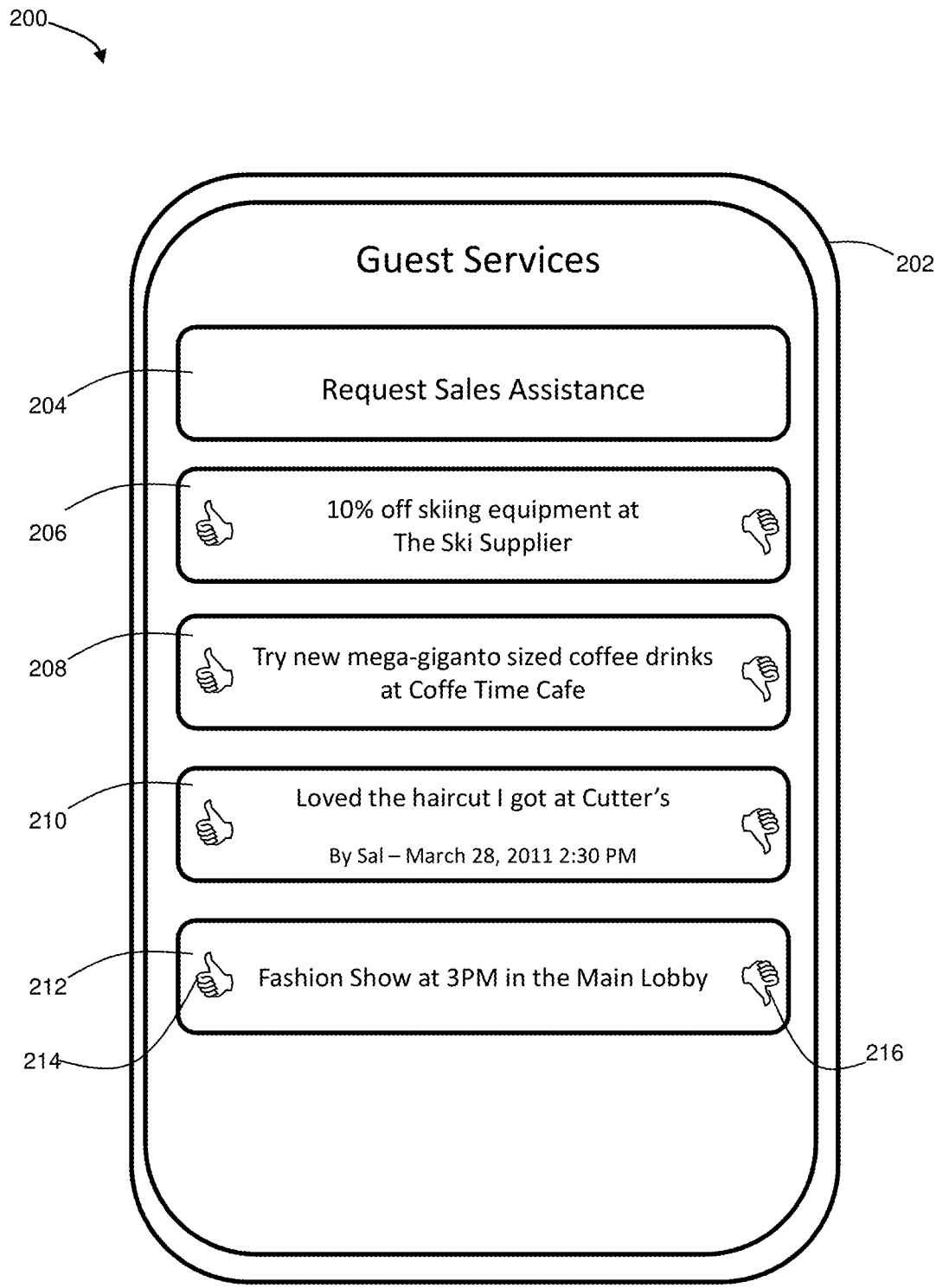
FIG. 2 shows an illustrative user interface for displaying content items on a wireless handset.

Referring now to FIG. 2, an illustrative user interface 200 for displaying content items on wireless handset 102 is shown. The user interface presents a plurality of content items to the user of wireless handset 102. A content item may be any information or product promotion shared with or created by a user. For example, a content item may include text, audio, video, image or a link such as a link to an external website, link to an interactive map or link to one or more content items. In some embodiments, a content item may be an application, such as a purchasing or gaming interface. A content item may be information provided by a facility to a user, such as content items 206, 208 and 212. Alternatively, a content item may be user-created content, such as content item 210. In some embodiments, a content item may activate command function or request function, such as content item 204.

Illustrative user interface 200 is shown displaying a wireless handset having a touchscreen-type interface; however, it will be appreciated that the user interface may be displayed on any wireless device having a display and a user input means (such as keypad, touchscreen interface, or stylus). Illustrative content items 204-212 are selectable items such as virtual buttons that are activated when the user touches the button on a touchscreen or selects the button with a pointing device.

A feedback input may be displayed proximate to or in conjunction with a content item. The feedback input allows a user to react to the content items displayed. In some embodiments, a positive feedback input, a negative feedback input, or both are displayed. The feedback inputs may be displayed, for example, as "thumbs up" and "thumbs down" symbols displayed on a user-created content item button, as shown at 214 and 216, respectively. The thumbs up and thumbs down input prompts are operable separately from the content item button. When a user selects a feedback input prompt, the wireless handset transmits a feedback message via the network to the network 106 indicating the feedback response, e.g., whether the feedback was positive ("thumbs up") or negative ("thumbs down"). The feedback message may also comprise information about the user, such as a unique user identification (e.g., the User_ID indicated in FIG. 3 below). Alternative feedback input means, such as a system that allows a user to rate a content item on a scale, such as a scale of one to ten or a scale of one to five, may be used.

A "positive feedback input" may also be referred to as a positive review. A "negative feedback input" as used herein may refer to a negative review.

Typically, the feedback input is used to modify a relevance weight value stored in association with the content item. The feedback input may be used to rank content to be displayed in the user interface. The content items transmitted from the network to the wireless handset may be filtered by relevance weight value such that a predetermined number of highest ranked content items are returned or such that only those content items exceeding a predetermined threshold are returned.

Referring now to FIG. 3, an illustrative database table entry 300 for a user profile is shown. The table may be populated by the user with information provided via a user profile interface on the wireless handset 102. In some embodiments, the user enters user profile information using an interface on a home computer or other device having access to network 106. User profile information is transmitted via network 108 to a database, such as a relevance engine database residing on network 106. The user profile information may be stored in the database in a database table, such as a User_Profile database table. The User_Profile table comprises the field user_ID 302. The illustrative entry 300 in the User_Profile table additionally comprises fields Display_Name 304, Gender 306, Zip_Code 308 and Age 310. In some embodiments, the User_Profile table stores additional information such as a user address, user phone number, user name, etc. In some embodiments, a birthday or an age range is stored for the user rather than an age of the user.

Referring to FIG. 4, an illustrative database table entry 400 for an attribute group is shown. The Attribute_Group table stores a unique identifier for each attribute group available to be associated with a user. Attribute groups for a user may include information provided by the user, such as a location of the user, a user interest, an age of the user or an age group to which the user belongs. In some embodiments, the attribute groups include information collected about a user, for example, information from the user's transaction history with a merchant.

The Attribute_Group table is stored in a database, such as a relevance engine database. The Attribute_Group table comprises fields Attribute_ID 402 and Attribute_Value 406. The illustrative entry 400 in the Attribute_Group table additionally comprises the field Attribute_Category 404. According to the illustrative entry in the Attribute_Group table, the attribute with the Attribute_ID number 11111111 is an attribute with attribute category "sport" and attribute value "skiing." If the user indicates skiing as an interest, the attribute ID for skiing may be associated with the user ID in a User_Attribute_Group database table as indicated in FIG. 5.

Referring to FIG. 5, an illustrative database table entry 500 for associating a user identification with an attribute group is shown. The User_Attribute_Group table comprises fields User_ID 502 and Attribute_ID 504. The illustrative entry in the User_Attribute_Group table associates user ID "12345678" with attribute id "11111111," indicating that user "Joe" having user ID 12345678 (as indicated in FIG. 2) is associated with the attribute skiing, identified by attribute ID 11111111. The table entry may have been created with Joe indicated an interest in skiing using a user profile interface or other user interface. Alternatively, a merchant or other content administrator may have determined that Joe is interested in skiing based on, for example, Joe's purchases of skiing equipment from the merchant, and created the User_Attribute_Group table entry shown accordingly.

Referring to FIG. 6, an illustrative database table entry 600 for associating a content item with an attribute group and storing a relevance weight value for the association is shown. The Group_Content_Rating table comprises fields Content_ID 602, Attribute_ID 604 and Relevance_Weight 606. Content_ID has value "00000001," indicating a unique identification for a content item. Illustrative content items are shown in FIG. 2. For example, content item 00000001 may be text advertising a sale on skis. In the illustrative entry, content 00000001 in association with attribute 11111111 (skiing) has a relevance weight value of 105.

By way of illustration, user Joe (having user ID 12345678) has indicated an interest in skiing, resulting in the User_Attribute_Group entry shown in FIG. 4. Content item 00000001 may be an advertisement for a sale on skiing equipment, such as content item 206 shown in FIG. 2. When Joe provides positive feedback for content item 00000001, all attribute groups associated with Joe and the content item receive an increase to the relevance weight value. If, for example, an initial relevance weight value of 100 is used for the association between Content_ID 00000001 (e.g., the skiing advertisement) and Attribute_ID 11111111 (e.g., skiing), the positive feedback results in a point increase, for example, a five point increase, resulting in an adjusted relevance weight value of 105. Methods for adjusting Relevance_Weight 606 are described in more detail with reference to FIGS. 11 and 12.

Referring to FIG. 7, an illustrative database table entry 700 for associating a content item with a location identifier and storing a relevance weight value for the association is shown. The Location_Content_Rating table comprises fields Content_ID 702, Location_ID 704 and Relevance_Weight 706. Location_ID has value "22222222," indicating a unique identification for a location.

In some embodiments, the Location_ID is a unique identification associated with a geofence 116. For example, a database table entry may associate a set of coordinates corresponding to the area bounded by a geofence with a unique Location_ID. The wireless handset 102 is configured to determine whether it is located within a geofence. In some embodiments, the wireless handset may receive content items associated with the geofence in which the wireless handset is located.

In one exemplary embodiment, the location of the wireless handset is determined based on signals received by the wireless handset from beacons. The beacon is typically a radio frequency transmitter, for example, a wireless access point, femtocell, or other device that allows devices to connected to a wireless network using Wi-Fi, Bluetooth, or other wireless standards. The wireless handset 102 transmits to location detection module 108 a location message comprising a signal strength and signal identifier associated with each beacon detected by the wireless handset. Based on the information received in the location message, the location detection module determines the location of the wireless handset.

Figure 10:
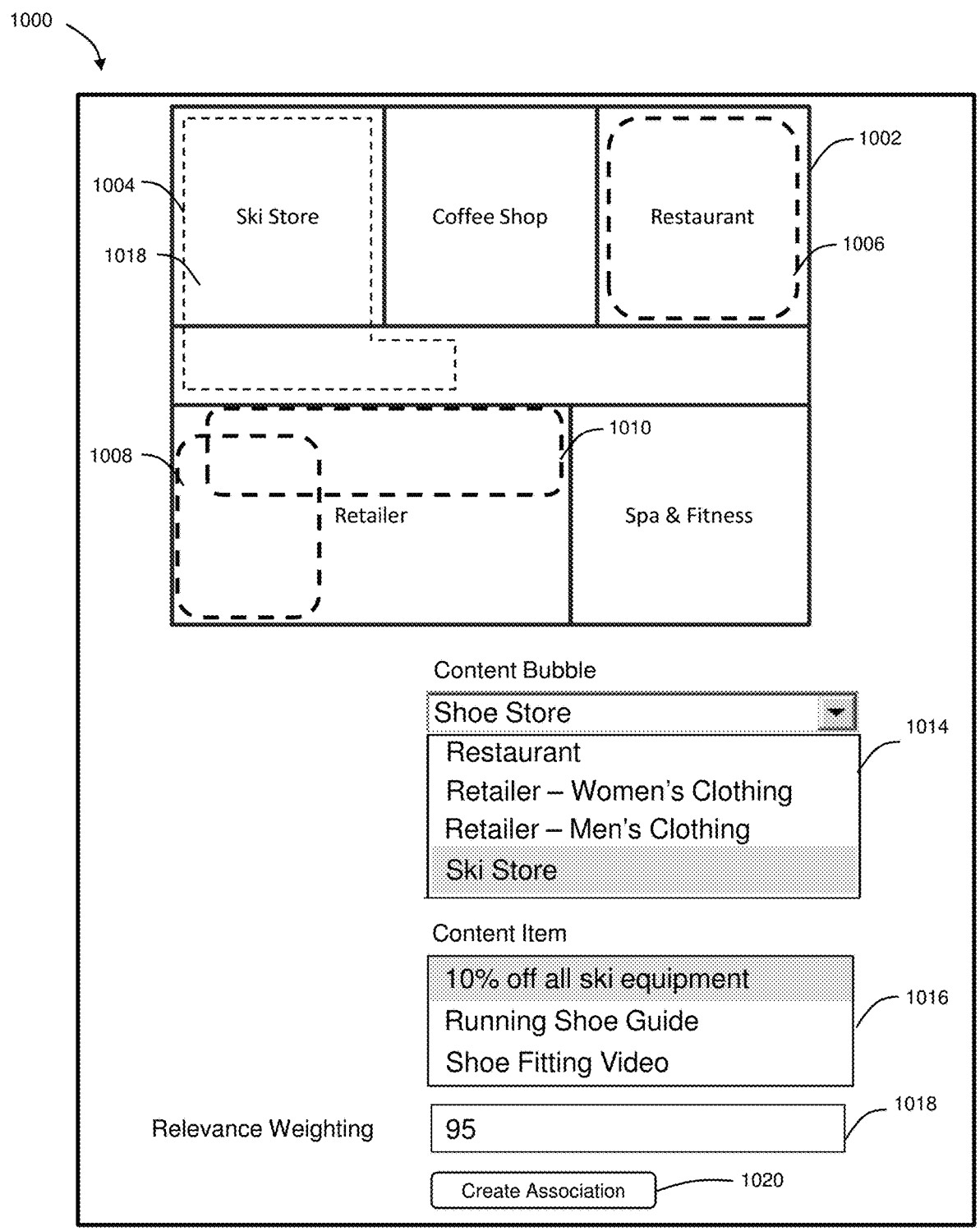
FIG. 10 shows an illustrative geofence creation interface.

In some embodiments, the location of the wireless handset relative to a geofence such as geofence 116 is determined. An interface for indicating the location of geofences and associating content with geofences are shown in FIG. 10.

In alternative embodiments, Location_ID may be associated with a zip code, city, or other location information entered in a user profile. In other embodiments, a Location_ID may be associated with a set of GPS coordinates as determined by the wireless handset or a distance range surrounding any of the preceding (e.g., a 300 foot radius surrounding a set of GPS coordinates).

In some embodiments, the Location_ID is associated with a building name, room name, business name, attraction name, or other named location. The named location may be entered into a user interface on the wireless handset or selected from a menu displayed on the wireless handset.

In some embodiments, Location_ID may indicate a location determined by scanning a code, such as a QR code, with the wireless handset. In other embodiments, Location_ID may identify a location as determined from an image of the environment captured with the wireless handset.

By way of illustration, content item 00000001 may be an advertisement for a sale on skiing equipment, such as content item 206. In one example, the wireless handset displaying content item 206 is located in a geofence encompassing the ski store to which the advertisement applies. If the user of the handset provides negative feedback, the relevance weight value associated with location (e.g., the ski store geofence) and the content item (e.g. the ski equipment advertisement) is decreased by a predetermined point value. If, for example, an initial relevance weight value of 100 is used for the association between Content_ID 00000001 and Location_ID 22222222, the negative feedback results in a point decrease, for example, a five point decrease, resulting in an adjusted relevance weight value of 95. A method for adjusting Relevance_Weight 706 is described in more detail with reference to FIGS. 11-12.

Figures 8A, 8B:
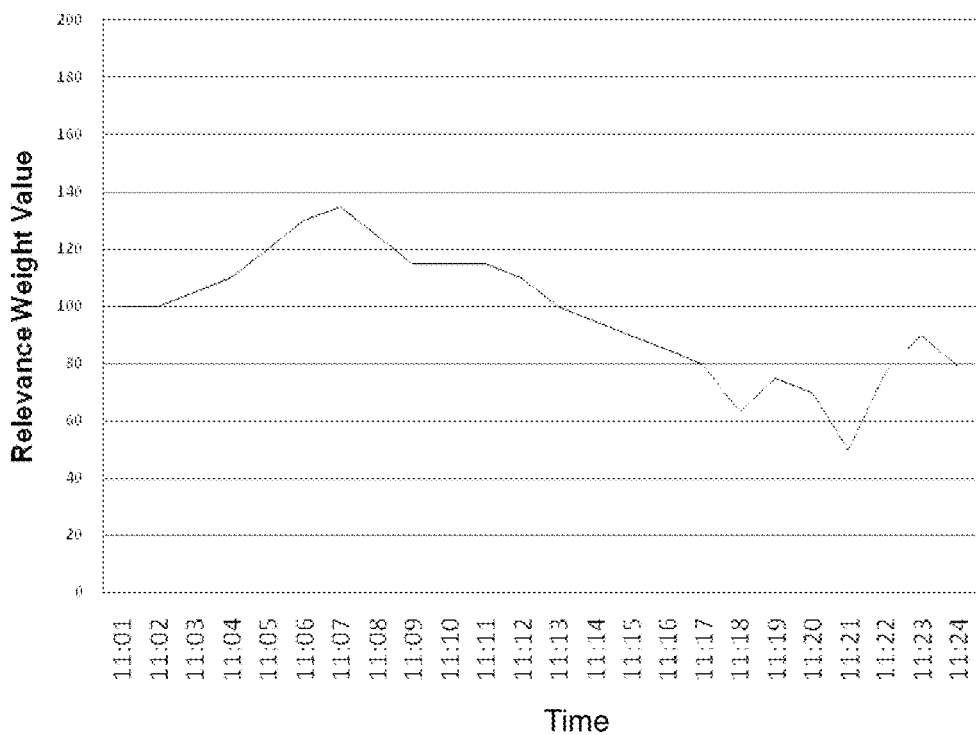
FIG. 8A shows an illustrative database table entry for associating a content item with a time a relevance weight value.
FIG. 8B shows an illustrative graph showing a change in relevance weight value for a content item over time.

Referring now to FIG. 8A, an illustrative database table entry 800 for associating a content item with a time and a relevance weight value. The Content_Rating_Time table comprises fields Content_ID 802, Time 804 and Relevance_Weight 806. Each time the relevance weight for a content item changes, the relevance weight value and time are logged such that a record of the change in relevance weight for the content item over time as shown in FIG. 8B may be created. The Content_Rating_Time table may further comprise field Attribute_ID or Location_ID to allow the change in relevance weight value over time to be analyzed for a particular attribute group or location.

Referring to FIG. 8B, a graph showing a change in relevance weight value for a content item over time is shown. The graph shown in FIG. 8B may be created from the entries in the Content_Rating_Time table. The change in relevance weight value over time may be useful to content administrators in assessing the success of content items.

Figure 9:
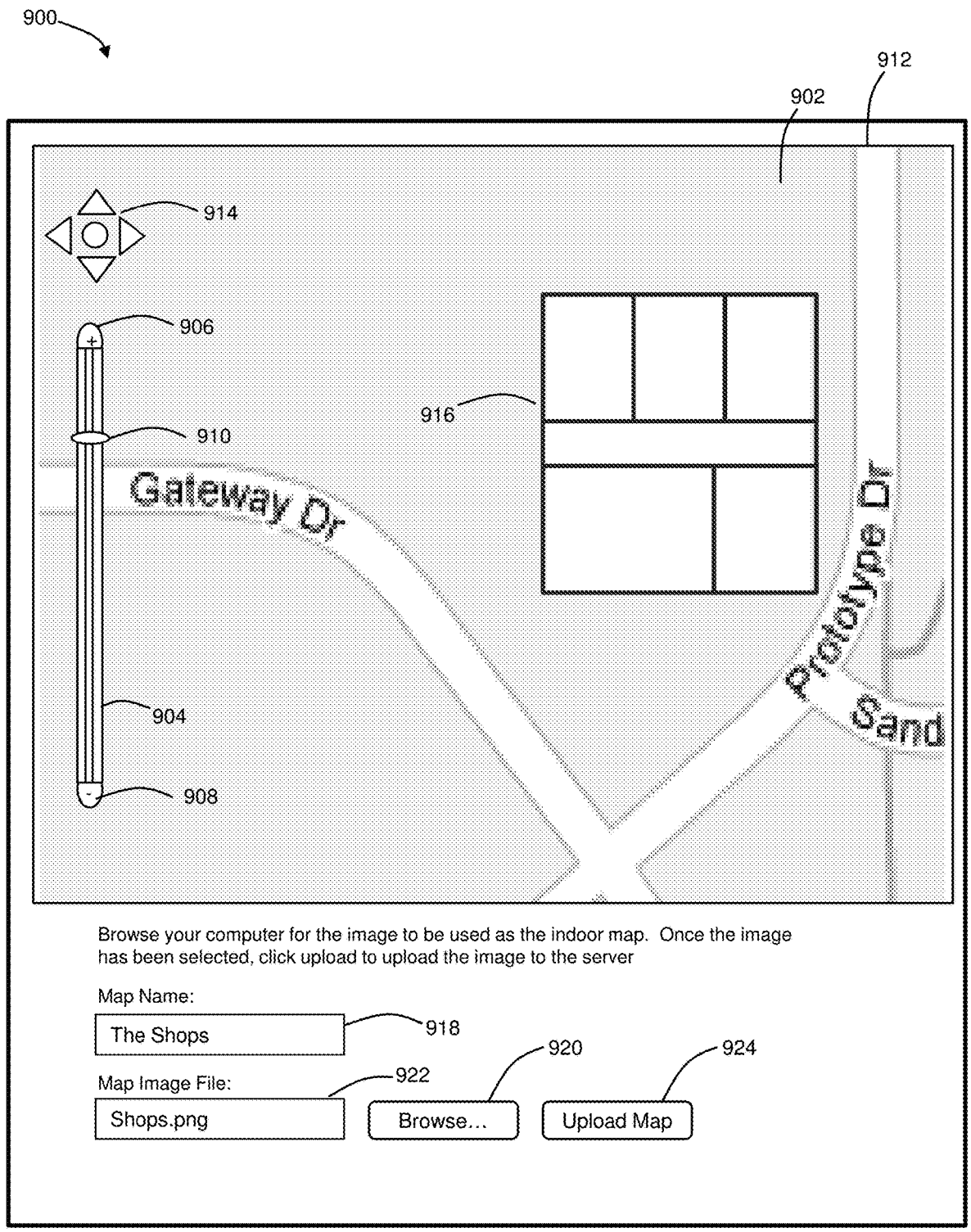
FIG. 9 shows an illustrative geographic information system interface.

Referring now to FIG. 9, an illustrative geographic information system (GIS) interface 900 is shown. A content administrator for a premises may indicate the location of a premises map relative to a street map using the GIS interface. The content administrator may use magnification bar 904 to adjust the magnification of street map 902 to the appropriate scale for placement of the premises map. Magnification bar 904 comprises increase magnification indicator 906, decrease magnification indicator 908, and sliding magnification control 910. The content administrator may slide the sliding magnification control 910 in the direction of the increase magnification indicator 906 to increase the level of magnification of the map and may slide the sliding magnification control 910 in the direction of the decrease magnification indicator 908 to reduce the level of magnification of the map. To change the position of the street map 902 within map window 912, navigation control 914 may be used. Navigation control 914 comprises an up arrow, a down arrow, a left arrow and a right arrow. To move the street map in the desired direction, the arrow pointing in the desired direction is mouse clicked. Navigation may additionally or alternatively be accomplished by mouse clicking on street map 902, holding down the mouse button, and moving the mouse to slide the map in the desired direction. It will be recognized that other methods for adjusting map magnification and map position within the map window may be used.

When the appropriate level of magnification has been reached, the content administrator may insert a merchant premises map image 916 over the street map and position the premises map relative to the street map. The content administrator may be prompted to enter a name for the premises map in a text box such as map name text box 918. The content administrator selects a map image file to insert over the street map. For example, the content administrator may click a browse button 920 to open a dialog box allowing the content administrator to choose a map image file from a file directory. When an image file has been selected, the name of the image file may appear in a text box as shown at 922. The content administrator may then upload the selected map, for example, by hitting an upload map button 924. After the map is uploaded, it appears within map window 912. The premises map image 916 may be resized and rotated with mouse controls or other interface controls. The content administrator may place the premises map image 916 in the appropriate position relative to street map 902. For example, the content administrator may place the premises map image by mouse clicking on the premises map image, holding down the mouse button, and dragging the premises map image to the desired position. It will be recognized that other methods for selecting a map image and positioning it at a desired location on a street map may be used. The position of premises map 916 relative to street map 902 is stored, for example, on a network. The level of magnification and position of street map 902 within map window 912 may also be stored. The image file or a string representing a path to the image file may also be stored. Additionally, the map name entered in text box 918 may be stored.

Referring to FIG. 10, an illustrative geofence creation interface 1000 is shown. A geofence is a virtual boundary indication inserted by a user on a premises map using a graphical user interface. The content administrator provides a map 1002, such as a premises floor plan, on which the geofences will be defined. The map may be provided by uploading an image file to the GIS interface as indicated in FIG. 9. The content administrator uses a shape drawing tool to define a geofence. The shape drawing tool may allow the content administrator to create rectangles, polygons, or other shapes overlayed on the premises map 1002. If the map has been uploaded into a GIS interface, the geofence may be stored as a set of coordinates (e.g, a longitude and latitude for each vertex of the geofence). After a geofence shape has been created, the content administrator may be prompted by the geofence application to enter an identifier for the geofence.

The geofence interface may comprise geofence selection drop down menu 1014 and content item selection drop down menu 1016. To create an association between a content item and a geofence, the desired geofence and the desired content item are selected from the geofence selection drop down menu and the content item selection drop down menu, respectively. In FIG. 10, geofences 1004, 1006, 1008 and 1010 have been defined, corresponding to the Ski Store, Restaurant, Retailer-Women's Clothing and Retailer-Men's Clothing, respectively.

In an illustrative example, the location "Ski Store" has been selected from geofence selection drop down menu 1014 and the content item "10% off all ski equipment" has been selected from content item menu 1016. Using relevance weighting box 1018, the content administrator may assign an initial relevance weight value to the geofence-content association created in tables 1014-1016. When the content administrator selects Create Association control 1020, an association has been created between ski equipment sale content item and the Ski Store geofence, indicated at 1004. For example, the database table entry shown in FIG. 7 may be created when the Create Association control is selected. An application, for example an application running on a server hosting the database, looks up the Location_ID associated with the location "Ski Store" and the Content_ID associated with content item "10% off all ski equipment" to enter the corresponding unique identifiers for Location_ID and Content_ID into table entry 700.

As the user moves through the shopping area indicated in premises map 1002, the user's wireless handset 102 periodically sends a location message to location detection module 108. The location detection module determines the location of the wireless handset based on whether the handset is located within a geofence such as geofence 1004. Content delivery module 110 may send content items associated with geofence 1004 to the wireless device when the wireless device is located within geofence 1004. When the user provides feedback on the content item associated with the geofence location, the relevance weigt value associated with the content item and the location is adjusted.

Figure 11:
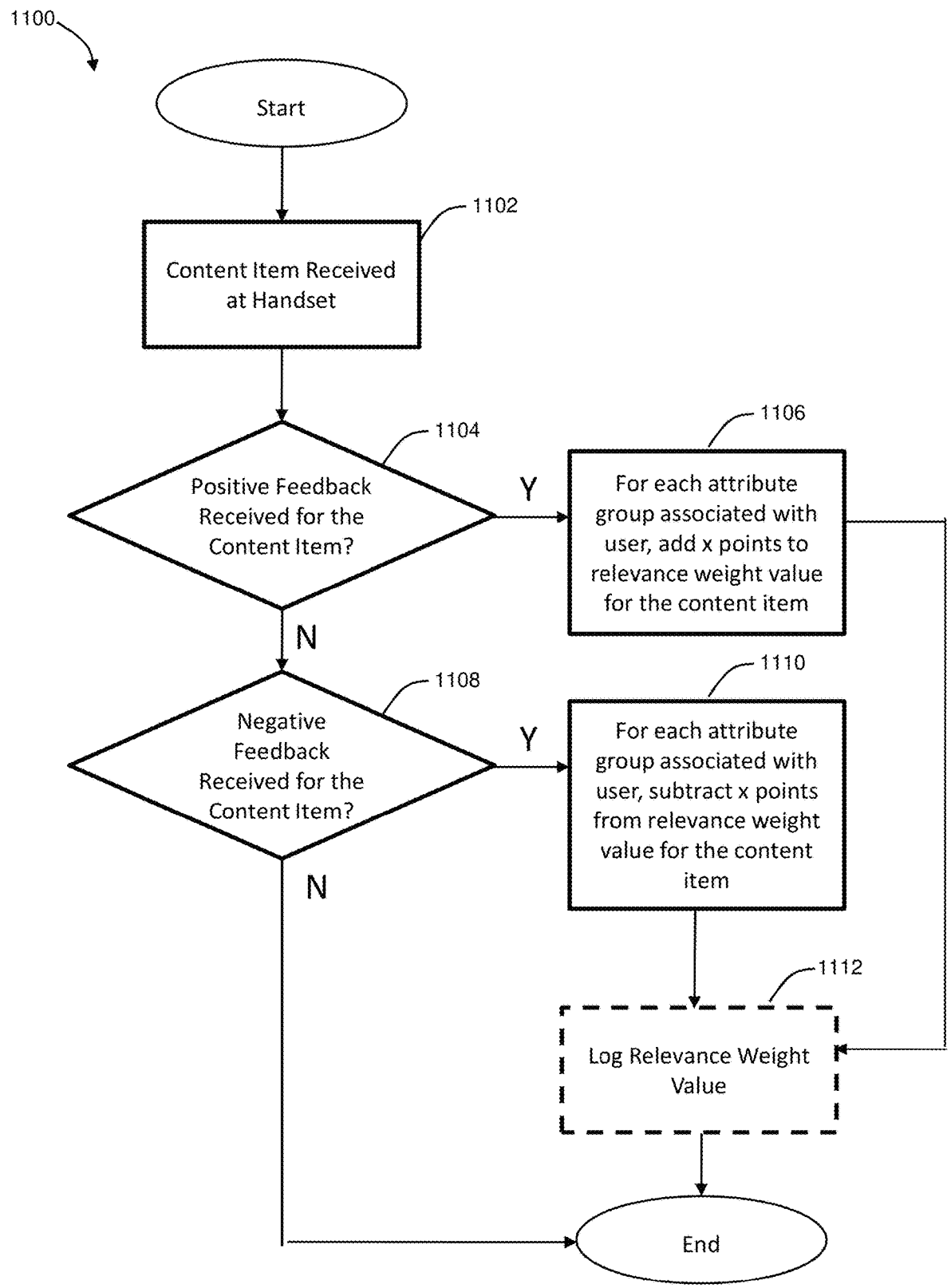
FIG. 11 shows an illustrative flow chart indicating a method for adjusting relevance weighting according to a first embodiment.

Referring now to FIG. 11, an illustrative flow chart indicating a method for adjusting relevance weighting according to a first embodiment is shown. The method begins at block 1102, at which a content item is received at the wireless handset 102. The content item may be one of a plurality of content items displayed on the handset. At decision diamond 1104, relevance weight adjustment module 114 determines whether positive feedback has been received from the wireless handset. If positive feedback has been received for a content item, the method proceeds to block 1106. At block 1106, for each attribute group associated with the user who provided the positive feedback, a point value x is added to the value of the Relevance_Weight field of the Group_Content_Rating entry having a Content_ID value matching the content item identifier and an Attribute_ID value matching the attribute identifier. Point value x may be any point value, for example, 5 points.

For example, if user 12345678 (display name "Joe") provides positive feedback for the content item having content identifier 00000001, all attribute groups associated with user 12345678 are located. Accordingly, the User_Attribute_Group table is queried to return all entries for user 12345678. Since the attribute having attribute identifier 11111111 is associated with user 12345678 in the User_Attribute_Group table, the relevance weight associated with Attribute_ID 11111111 will be modified for the selected content item. In the Group_Content_Rating table, the value of Relevance_Weight is adjusted for the entry having Content_ID 00000001 and Attribute_ID 11111111. Because positive feedback was provided, a point value is added to the current value of Relevance_Weight. For example, when positive feedback is provided, 5 points may be added to the current value of Relevance Weight.

If no entry exists in Group_Content_Rating table having an Attribute_ID matching an attribute of the user providing feedback and a Content_ID of the content item for which feedback was received, a new entry is created in Group_Content Rating when the feedback is received. The new entry has a Content_ID matching the identifier of the content item for which feedback was received and an Attribute_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

If additional attribute entries were located for user 12345678 in the User_Attribute_Group table, the Relevance_Weight value is adjusted for the additional attributes. The process of creating new records (where necessary) and modifying the Relevance_Weight value is continued until the relevance weight has been adjusted for each attribute group associated with the user.

In some embodiments, the method proceeds to optional block 1112, at which the adjusted relevance weight value is logged. For example, an entry in a database table such as Content_Rating_Time may be made.

If no positive feedback is received for a content item, the method proceeds to decision diamond 1108, at which it is determined whether negative feedback has been received for the content item. If negative feedback has been received, the method proceeds to block 1110. At block 1110, for each attribute group associated with the user who provided the negative feedback, a point value x is subtracted from the value of the Relevance_Weight field of the Group_Content_Rating entry having a Content_ID value matching the content item identifier and an Attribute_ID value matching the attribute identifier. In some embodiments, the point value subtracted from the relevance weight value as described at step 1110 is different from the point value added to the relevance weight value as described at step 1106.

If no entry in the Group_Content_Rating table exists for the Content_ID and Attribute_ID, a new entry is created as described above. The method then proceeds to optional step 1112 at which the relevance weight value is logged.

Figure 12:
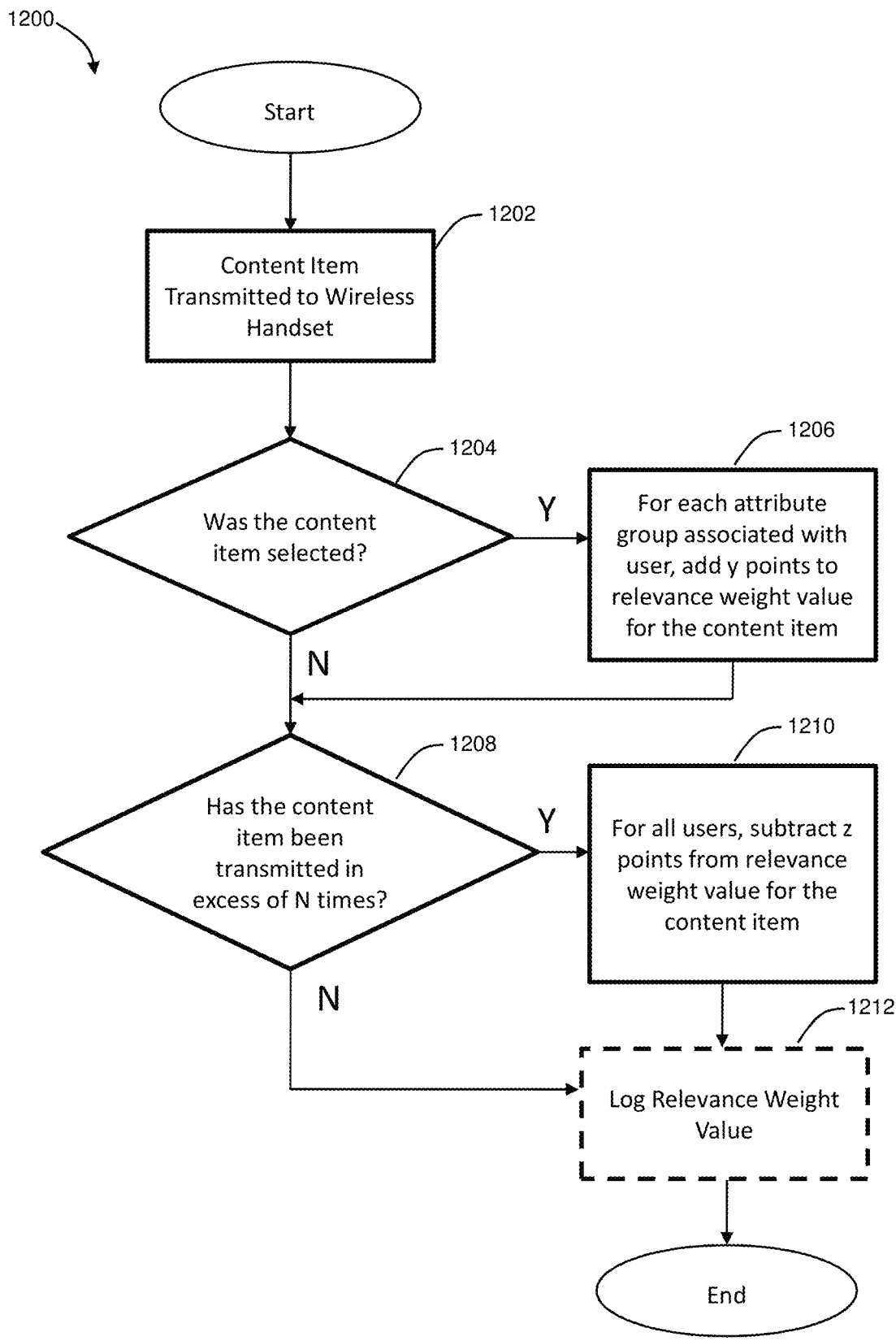
FIG. 12 shows an illustrative flow chart indicating a method for adjusting relevance weighting according to a second embodiment.

Referring now to FIG. 12, an illustrative flow chart indicating a method for adjusting relevance weighting according to a second embodiment is shown. The method begins at block 1202, at which a content item is transmitted to the wireless handset 102. The content item may be one of a plurality of content items displayed on the handset. At decision diamond 1204, relevance weight adjustment module 114 determines whether the content item was selected. A user may select a content item by, for example, clicking a content item button such as content item button 206. If the content item is selected, the method proceeds to block 1206. At block 1206, for each attribute group associated with the user who provided the positive feedback, a point value y is added to the value of the Relevance_Weight field of the Group_Content_Rating entry having a Content_ID value matching the content item identifier and an Attribute_ID value matching the attribute identifier. Point value y may be any point value, for example, 2 points. If no entry in the Group_Content_Rating table exists for the Content_ID and Attribute_ID, a new entry is created as described above.

The method proceeds to block 1208, at which the relevance weight adjustment module determines whether a content item has been transmitted by content delivery module 110 in excess of N times. N may be a number of times a content item is delivered from network 106 to wireless handset 102 or the number of times a content item is delivered to all wireless handsets capable of receiving the content item. For example, N may be 10 serves. If the content item has been transmitted in excess of N times, z points are subtracted from the value of the Relevance_Weight field of the Group_Content_Rating entry having a Content_ID value matching the content item for all users. Point value z may be any point value, for example, 5 points.

To adjust the Relevance_Weight field for all users, an attribute group having a predetermined Attribute_ID, for example, Attribute_ID 00000000, may be associated with every contact ID. For example, each time a new User_ID is created, User_Attribute_Group may receive an entry associating the new User_ID with Attribute_ID 00000000. The Relevance_Weight value may be adjusted for the Group_Content_Rating entry having a Content_ID value matching the delivered content item and Attribute_ID 00000000. In this manner, the relevance weight is adjusted for all users when a content item has been transmitted in excess of N times.

In some embodiments, the method then proceeds to optional step 1212 at which the relevance weight value is logged.

Figure 13:
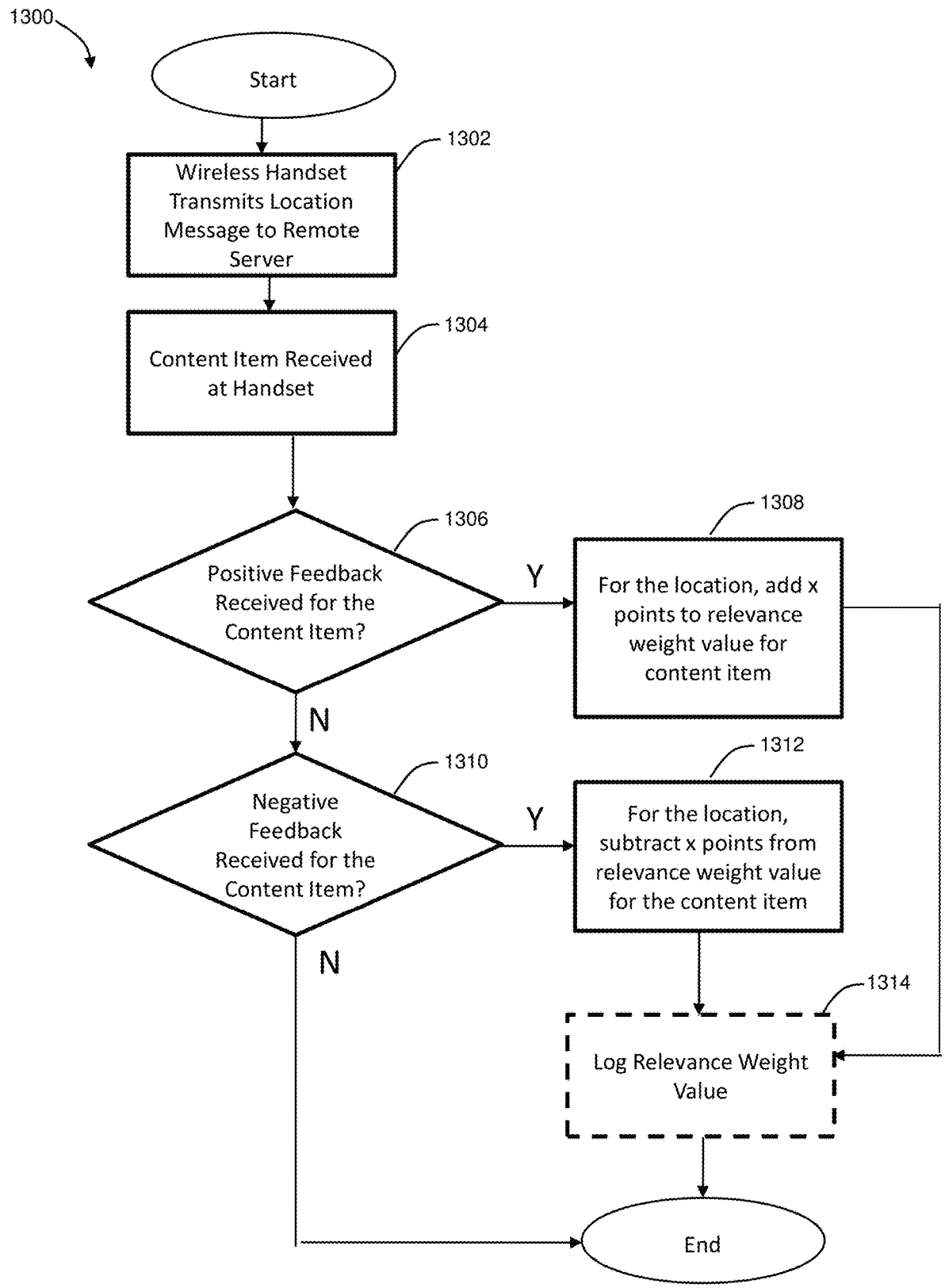
FIG. 13 shows an illustrative flow chart indicating a method for adjusting relevance weighting according to a third embodiment.

Referring now to FIG. 13, an illustrative flow chart indicating a method for adjusting relevance weighting according to a third embodiment is shown. The method begins at block 1302, at which a wireless handset transmits a location message to location detection module 108. The location message comprises information about the location of the wireless handset. The location is identified by unique identifier Location_ID. At block 1304, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1306, relevance weight adjustment module 114 determines whether positive feedback has been received from the wireless handset. If positive feedback has been received for a content item, the method proceeds to block 1308. At block 1308, a point value x is added to the value of the Relevance_Weight field of the Location_Content_Rating entry having a Content_ID value matching the content item identifier and an Location_ID value matching the location identifier. Point value x may be any point value, for example, 5 points.

If no entry exists in Location_Content_Rating table having an Attribute_ID matching an attribute of the user providing feedback and a Content_ID of the content item for which feedback was received, a new entry is created in Location_Content_Rating when the feedback is received. The new entry has a Content_ID matching the identifier of the content item for which feedback was received and a Location_ID matching the identifier of an attribute of the user providing feedback. When a new entry is created, the new entry may have a Relevance_Weight value that is a default value. Alternatively, the new entry may have a Relevance_Weight value that is the sum of a default value and the point value modification resulting from the user feedback.

In some embodiments, the method proceeds to optional block 1314, at which the adjusted relevance weight value is logged. For example, an entry in a database table such as Content_Rating_Time may be made.

If no positive feedback is received for a content item, the method proceeds to decision diamond 1310, at which it is determined whether negative feedback has been received for the content item. If negative feedback has been received, the method proceeds to block 1312. At block 1312, for the Location_ID matching the location identifier, a point value x is subtracted from the value of the Relevance_Weight field of the Location_Content_Rating entry having a Content_ID value matching the content item identifier and Location_ID value matching the location identifier. In some embodiments, the point value subtracted from the relevance weight value as described at step 1312 is different from the point value added to the relevance weight value as described at step 1306.

If no entry in the Location_Content_Rating table exists for the Content_ID and Attribute_ID, a new entry is created as described above. The method then proceeds to optional step 1314 at which the relevance weight value is logged.

Figure 14:
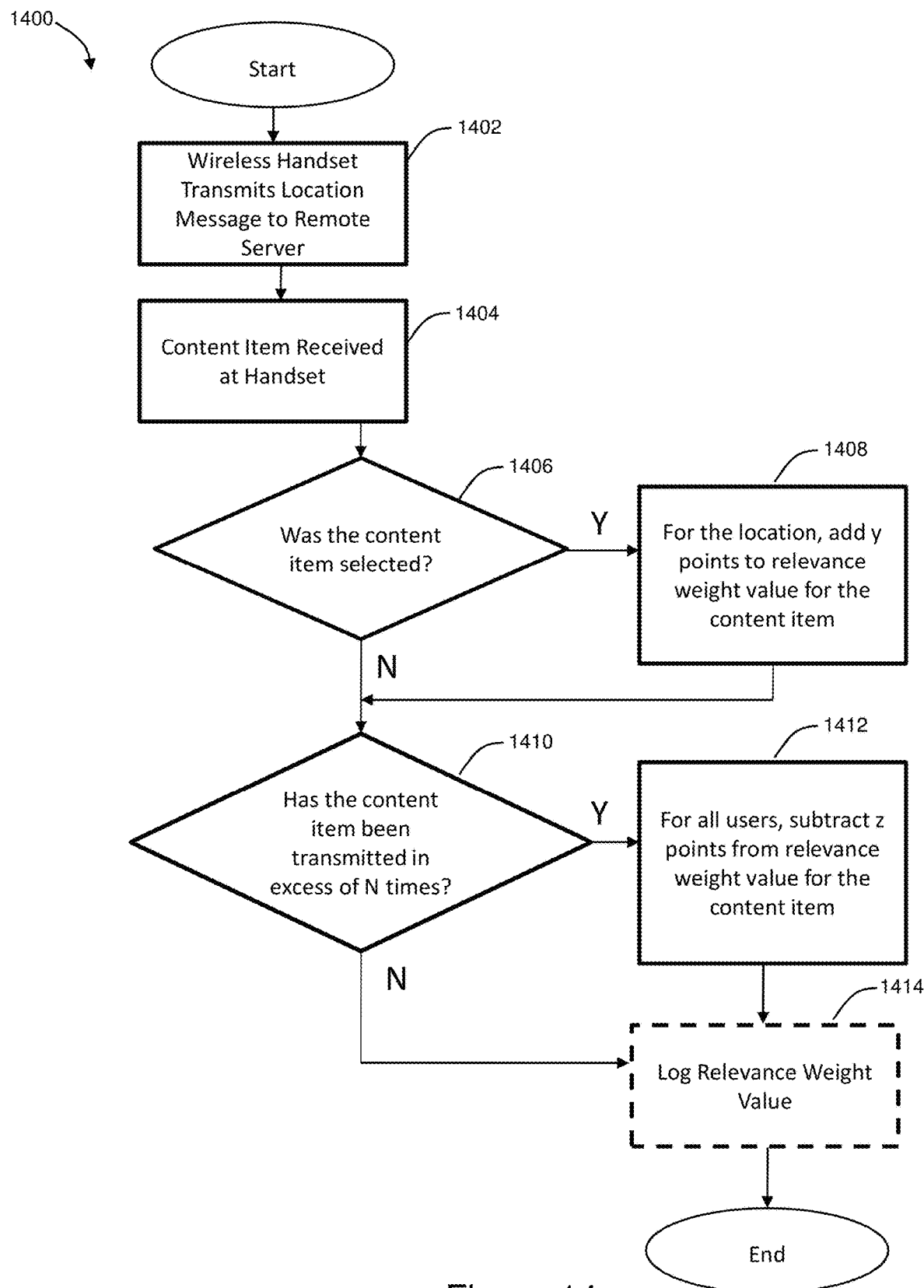
FIG. 14 shows an illustrative flow chart indicating a method for adjusting relevance weighting according to a fourth embodiment.

Referring now to FIG. 14, an illustrative flow chart indicating a method for adjusting relevance weighting according to a fourth embodiment is shown. The method begins at block 1402, at which a wireless handset transmits a location message to network 106. The location message comprises information about the location of the wireless handset. The location is identified by unique identifier Location_ID. At block 1404, a content item is received at the wireless handset 102. In some embodiments, the content item received is related to the location information transmitted in the location message. For example, the content item Content_ID is associated with a Location_ID in an entry in a database table such as the Location_Content_Rating table indicated at FIG. 7. The content item may be one of a plurality of content items displayed on the handset.

At decision diamond 1406, relevance weight adjustment module 114 determines whether the content item was selected. A user may select a content item by, for example, clicking a content item button such as content item button 206. If the content item is selected, the method proceeds to block 1408. At block 1408, for the Location_ID of the location reported by the wireless handset, a point value y is added to the value of the Relevance_Weight field of the Location_Content_Rating entry having a Content_ID value matching the content item identifier and an Attribute_ID value matching the attribute identifier. Point value y may be any point value, for example, 2 points. If no entry in the Location_Content_Rating table exists for the Content_ID and Attribute_ID, a new entry is created as described above The method proceeds to block 1410, at which the relevance weight adjustment module determines whether a content item has been transmitted by content delivery module 110 in excess of N times. N may be a number of times a content item is delivered from network 106 to wireless handset 102 or the number of times a content item is delivered to all wireless handsets capable of receiving the content item. For example, N may be 10 serves during which the content item is delivered. If the content item has been transmitted in excess of N times, z points are subtracted from the value of the Relevance_Weight field of the Location_Content_Rating entry having a Content_ID value matching the content item for all users. Point value z may be any point value, for example, 5 points.

To adjust the Relevance_Weight field for all users, a location having a predetermined Location_ID, for example, Location_ID 00000000, may be associated with every contact ID. For example, each time a new User_ID is created, User_Attribute_Group may receive an entry associating the new User_ID with Location_ID 00000000. The Relevance_Weight value may be adjusted for the Location_Content_Rating entry having a Content_ID value matching the delivered content item and Location_ID 00000000. In this manner, the relevance weight is adjusted for all users when a content item has been transmitted in excess of N times.

In some embodiments, the method then proceeds to optional step 1414 at which the relevance weight value is logged.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A system for adjusting a relevance weight value for a content item, comprising:
   a network;
   a plurality of beacons, wherein each of the plurality of beacons is communicatively coupled to the network, wherein each beacon of the plurality of beacons transmits a signal including a signal identifier;
   a content storage module communicatively coupled to the network, the content storage module configured to store a plurality of content items, the content storage module further configured to store an initial relevance weight value, at least one content item attribute, and a location in association with each content item;
   a user profile associated with a wireless device, wherein the user profile includes at least one user profile attribute;
   a content delivery module communicatively coupled to the network, the content delivery module configured to deliver a first subset of the plurality of content items to the wireless device via the network and exclude a second subset of the plurality of content items from delivery to the wireless device, wherein each content item of the first subset of content items is delivered to the wireless device based upon the at least one user profile attribute and at least one content item attribute of each content item of the first subset, wherein each content item of the second subset of content items is excluded from delivery to the wireless device based upon the at least one user profile attribute and at least one content item attribute of each content item of the second subset;
   a location detection module communicatively coupled to the network, the location detection module configured to determine a location of the wireless device;
   the wireless device comprising:
      a display configured to show the content items; and
      a user interface configured to receive feedback input associated with a content item, the user interface comprising:
         a positive review input corresponding to a positive feedback input; and
         a negative review input corresponding to a negative feedback input;
      wherein the wireless device configured to transmit to the location detection module a location message comprising a signal identifier from each beacon of the plurality of beacons detected by the wireless device; and a relevance weight adjustment module communicatively coupled to the network, the relevance weight adjustment module configured to perform:

a subtraction operation comprising subtracting a first point value from the relevance weight value associated with the location and the content item when a negative review input is selected; and an addition operation comprising adding a first point value to the relevance weight value associated with the location and the content item when a positive review input is selected.

2. The system of claim 1, wherein the user interface further comprises a selection input of the user interface, the selection input associated with a content item; and the relevance weight adjustment module further configured to perform a second addition operation comprising adding a second point value to the relevance weight value associated with the location and the content item when the content item is selected.

3. The system of claim 1, wherein the relevance weight adjustment module is further configured to perform a second subtraction operation, the second subtraction operation comprising subtracting a third point value from the relevance weight value associated with the content item and all locations when the content delivery module has delivered the content item to the wireless device in excess of a threshold number of deliveries.

4. The system of claim 1, wherein the location detection module is configured to determine an indoor location of the wireless device.

5. The system of claim 1, wherein the wireless device is configured to transmit an image to the location detection module, the location detection module configured to determine a location of the wireless handset based on an analysis of the image.

6. The system of claim 1, wherein the user interface further comprises a location menu, the location detection module configured to determine a location of the wireless handset based on a selection from the menu.

7. A system for adjusting a relevance weight value for a content item, comprising:

a network;

a plurality of beacons, wherein each of the plurality of beacons is communicatively coupled to the network, wherein each beacon of the plurality of beacons transmits a signal including a signal identifier;

a content storage module communicatively coupled to the network, the content storage module configured to store a plurality of content items, the content storage module further configured to store an initial relevance weight value, at least one content item attribute, and a location in association with each content item;

a user profile associated with a means for displaying content items, wherein the user profile includes at least one user profile attribute;

a means for displaying content items;

a content delivery module communicatively coupled to the network, the content delivery module configured to deliver a first subset of the plurality of content items to the means for displaying content items via the network and exclude a second subset of the plurality of content items from delivery to the means for displaying content items, wherein each content item of the first subset of content items is delivered to the means for displaying content items based upon the at least one user profile attribute and at least one content item attribute of each content item of the first subset, wherein each content item of the second subset of content items is excluded from delivery to the means for displaying content items based upon the at least one user profile attribute and at least one content item attribute of each content item of the second subset;

a location detection module communicatively coupled to the network, the location detection module configured to determine a location of a means for displaying content items;

the means for displaying content items comprising:

a user interface configured to receive feedback input associated with a content item, the user interface comprising:

a positive review input corresponding to a positive feedback input; and a negative review input corresponding to a negative feedback input; and the means for displaying content items further configured to transmit to the location detection module a location message comprising a signal identifier from each beacon of the plurality of beacons detected by the wireless device;

a relevance weight adjustment module communicatively coupled to the network, the relevance weight adjustment module configured to perform:

a subtraction operation comprising subtracting a first point value from the relevance weight value associated with the location and the content item when a negative review input is selected; and an addition operation comprising adding a first point value to the relevance weight value associated with the location and the content item when a positive review input is selected.

8. The system of claim 7, wherein the user interface further comprises a selection input of the user interface, the selection input associated with a content item; and the relevance weight adjustment module further configured to perform a second addition operation comprising adding a second point value to the relevance weight value associated with the location and the content item when the content item is selected.

9. The system of claim 7, wherein the relevance weight adjustment module is further configured to perform a second subtraction operation, the second subtraction operation comprising subtracting a third point value from the relevance weight value associated with the content item and all locations when the content delivery module has delivered the content item to the wireless device in excess of a threshold number of deliveries.

10. The system of claim 7, wherein the location detection module is configured to determine an indoor location of the means for displaying content items.

11. The system of claim 7, wherein the wireless device is configured to transmit an image to the location detection module, the location detection module configured to determine a location of the wireless handset based on an analysis of the image.

12. The system of claim 7, wherein the user interface further comprises a location menu, the location detection module configured to determine a location of the wireless handset based on a selection from the menu.

13. A method for adjusting a relevance weight value for a content item, comprising:

storing a plurality of content items with a content storage module communicatively coupled to a network;

storing an initial relevance weight value, at least one content item attribute, and a location in association with each content item;

delivering a plurality of content items to a wireless device via the network, wherein the wireless device is associated with a user profile that includes at least one user profile attribute;

transmitting, by each beacon of a plurality of beacons, a signal including a signal identifier;

transmitting from the wireless device to the location detection module a location message comprising a beacon identifier from each of one or more beacons detected by the wireless device;

determining a location of the wireless device with a location detection module;

displaying a first subset of the plurality of content items on the wireless device, wherein each content item of the first subset of content items is delivered to the wireless device based upon the at least one user profile attribute and at least one content item attribute of each content item of the first subset;

excluding from display on the wireless device a second subset of the plurality of content items, wherein each content item of the second subset of content items is excluded from delivery to the wireless device based upon the at least one user profile attribute and at least one content item attribute of each content item of the second subset;

receiving a feedback input with a user interface of the wireless device, the user interface comprising:

a positive review input corresponding to a positive feedback input for a content item; and a negative review input corresponding to a negative feedback input for a content item;

subtracting a first point value from the relevance weight value associated with the location and the content item when the negative review input is selected; and adding a first point value to the relevance weight value associated with a location and a content item when a positive review input is selected.

14. The method of claim 13, further comprising:

receiving a selection input with the user interface, the selection input associated with a content item; and adding a second point value to the relevance weight value associated with the location and the content item when the selection input is selected.

15. The method of claim 13, further comprising subtracting a third point value from the relevance weight value associated with the content item and all locations when the content delivery module has delivered the content item to the wireless device in excess of a threshold number of deliveries.

16. The method of claim 13, further comprising determining with the location detection module an indoor location of the wireless device.

17. The method of claim 13, further comprising transmitting from the wireless device to the location detection module an image, wherein the location detection module determines a location of the wireless handset based on an analysis of the image.

18. The method of claim 13, further comprising determining a location of the wireless handset with the location detection module based on a selection of a location from a location menu of the user interface.

* * * * *